United States Patent
Abramov et al.

(10) Patent No.: US 6,885,370 B2
(45) Date of Patent: Apr. 26, 2005

(54) SYSTEM AND METHOD FOR RENDERING IMAGES USING A RUSSIAN ROULETTE METHODOLOGY FOR EVALUATING GLOBAL ILLUMINATION

(75) Inventors: Georgy Abramov, Berlin (DE); Kristjan Valur Jonsson, Berlin (DE)

(73) Assignee: Mental Images GmbH, Berlin (DE)

( * ) Notice: Subject to any disclaimer, the term of this patent is extended or adjusted under 35 U.S.C. 154(b) by 314 days.

(21) Appl. No.: 10/165,179

(22) Filed: Jun. 7, 2002

(65) Prior Publication Data

US 2003/0052874 A1 Mar. 20, 2003

Related U.S. Application Data

(60) Provisional application No. 60/297,139, filed on Jun. 7, 2001.

(51) Int. Cl.$^7$ ............................................. G06T 15/60
(52) U.S. Cl. .................................................. 345/426
(58) Field of Search ................................. 345/419, 426

(56) References Cited

U.S. PATENT DOCUMENTS 6,529,193 B1 * 3/2003 Herken et al. ............. 345/426

FOREIGN PATENT DOCUMENTS

WO    WO 97 50060 A    12/1997

OTHER PUBLICATIONS

L. Szirmay–Kalos, et al., "Importance driven quasi–random walk solution of the rendering equation," Computers And Graphics, Pergamon Press Ltd., Oxford, GB, vol. 23, No. 2, Apr. 1999, pp. 203–211.

(Continued)

*Primary Examiner*—Mark Zimmerman
*Assistant Examiner*—Enrique L Santiago
(74) *Attorney, Agent, or Firm*—Richard A. Jordan

(57) ABSTRACT

A computer graphics system generate a pixel value for a pixel in an image to simulate global illumination represented by an evaluation of an unknown function $f$ of the form $$f(x) = g(x) + \int_0^1 K(x, y) f(y) dy,$$

$g(x)$ and $K(x,y)$ known functions, with $K(x,y)$ a "kernel" including a function associated with at least two colors. An estimator generator module generates "N" estimators $f^{(n)}{}_{lds, RR}(x)$ as $$\bar{f}^{(n)}_{lds,RR}(x) = g(x) + K(x, \xi_1^{(n)})S_1^{(n)} + K(x, \xi_2^{(n)})S_2^{(n)} + K(x, \xi_3^{(n)})S_3^{(n)} + \cdots,$$

or $$f^{(n)}_{lds,RR}(x) = g(x) + T_1^{(n)}(x)g(\xi_1^{(n)}) + T_2^{(n)}(x)g(\xi_2^{(n)}) + T_3^{(n)}(x)g(\xi_3^{(n)}) + \cdots,$$

where $$S_1^{(n)} := g(\xi_1^{(n)}),$$

$$S_{j+1}^{(n)} := \frac{\Theta\left(M_{K(\xi_{j+1}^n, \xi_j^{(n)}), S_j^{(n)}} - \xi_j'^{(n)}\right)}{M_{K(\xi_{j+1}^n, \xi_j^n), S_j^{(n)}}} K(\xi_{j+1}^n, \xi_j^n)S_j^{(n)},$$

and $$T_1^{(n)}(x) := \frac{\Theta\left(M_{K(x, \xi_1^{(n)}), 1} - \xi_1'^{(n)}\right)}{M_{K(x, \xi_1^{(n)}), 1}} K(x, \xi_1^{(n)}),$$

$$T_{j+1}^{(n)}(x) := \frac{\Theta\left(M_{K(\xi_j^{(n)}, \xi_{j+1}^{(n)}), T_j^{(n)}(x)} - \xi_j'^{(n)}\right)}{M_{K(\xi_j^{(n)}, \xi_{j+1}^{(n)}), T_j^{(n)}(x)}} K(\xi_j^{(n)}, \xi_{j+1}^{(n)})$$

with $$M_{A,B} := \begin{cases} \dfrac{\int_0^\infty A_\lambda B_\lambda d\lambda}{\int_0^\infty B_\lambda d\lambda}, & \text{if } \int_0^\infty B_\lambda d\lambda > 0 \\ 0, & \text{if } \int_0^\infty B_\lambda d\lambda = 0, \end{cases}$$

$\Theta(x)$ representing the Heaviside function, $\xi_1^{(n)}, \xi'_1{}^{(n)}, \ldots,$ $\xi_L{}^{(n)}, \xi'_L{}^{(n)}$ components of a multi-dimensional strictly deterministic low-discrepancy sequence and "n" a sequence index. A luminance value module generates a luminance value for the point in the scene as the average of the estimator values generated by the estimator generator module. A pixel value generator module uses the luminance value generated for the point in the scene in generating the pixel value.

42 Claims, 1 Drawing Sheet

OTHER PUBLICATIONS

L. Szirmay–Kalos, "Stochastic iteration for non–diffuse global illumination," Computer Graphics Forum, Amsterdam, NL, vol., 18, No. 3, Sep. 7, 1999, pp. C233–C244.

M. Bolin, et al., "An error metric for Monte Carlo ray tracing," Proc. Eurographics Workshop, St. Etienne, Jun. 16–18, 1997, Vienna, Springer, AU, vol. Workshop 8, Jun. 16, 1997, pp. 57–68.

L. Szirmay–Kalos, et al., "Global ray–bundle tracing with infinite number of rays," Computers And Graphics, Pergamon Press Ltd., Oxford, GB, vol. 23, No. 2, Apr. 1999, pp. 193–202.

* cited by examiner

SYSTEM AND METHOD FOR RENDERING IMAGES USING A RUSSIAN ROULETTE METHODOLOGY FOR EVALUATING GLOBAL ILLUMINATION

This application claims the benefit of Provisional application Ser. No. 60/297,139, filed Jun. 7, 2001.

INCORPORATION BY REFERENCE

U.S. patent application Ser. No. 08/880,418, filed Jun. 23, 1997, in the names of Martin Grabenstein, et al., entitled "System And Method For Generating Pixel Values For Pixels In An Image Using Strictly Deterministic Methodologies For Generating Sample Points," (hereinafter referred to as the Grabenstein application) assigned to the assignee of this application, incorporated by reference.

FIELD OF THE INVENTION

The invention relates generally to the field of computer graphics, and more particularly to systems and methods for generating pixel values for pixels in an image being rendered using strictly-deterministic low-discrepancy sequences to provide sample points for generating estimates of values of integrals representing the pixel values.

BACKGROUND OF THE INVENTION

In computer graphics, a computer is used to generate digital data that represents the projection of surfaces of objects in, for example, a three-dimensional scene, illuminated by one or more light sources, onto a two-dimensional image plane, to simulate the recording of the scene by, for example, a camera. The camera may include a lens for projecting the image of the scene onto the image plane, or it may comprise a pinhole camera in which case no lens is used. The two-dimensional image is in the form of an array of picture elements (which are variable termed "pixels" or "Pels"), and the digital data generated for each pixel represents the color and luminance of the scene as projected onto the image plane at the point of the respective pixel in the image plane. The surfaces of the objects may have any of a number of characteristics, including shape, color, specularity, texture, and so forth, which are preferably rendered in the image as closely as possible, to provide a realistic-looking image.

Generally, the contributions of the light reflected from the various points in the scene to the pixel value representing the color and intensity of a particular pixel are expressed in the form of the one or more integrals of relatively complicated functions. One rendering methodology, "global illumination," includes a class of optical effects, such as indirect illumination, reflections off surfaces with various types of characteristics, such as diffuse, glossy and specular surfaces, caustics and color bleeding, which the are simulated in generating an image. In global illumination, a "rendering equation" is solved, which has a general form $$f(x) = g(x) + \int_0^1 K(x, y) f(y) dy \qquad (1)$$

where "g" and "K" are known functions ("K" is sometimes referred to as the "kernel" of the integral equation), and "f" is an unknown function. Generally, "f(x)" represents the luminance at a particular point in the image from a particular direction and "g(x)" represents ambient illumination. The function "K," is typically a complex function typically including factors such as characteristics of the objects' surfaces, such as the degree to which they are glossy, diffuse and/or specular, the angular relationships of surfaces with respect to each other, whether one surface is visible from another, and so forth. In connection with one aspect of simulation using ray tracing, in which an image as viewed by an observer is simulated by tracing rays, representing photons, between a light source and the eye of the observer, the unknown function "f" can be obtained as $$f(x) = g(x) + \int_0^1 K(x, x_1) g(x_1) dx_1 + \qquad (2)$$
$$\int_0^1 \int_0^1 K(x, x_1) K(x_1, x_2) g(x_2) dx_1 dx_2 +$$
$$\int_0^1 \int_0^1 \int_0^1 K(x, x_1) K(x_1, x_2) K(x_2, x_3) g(x_3) dx_1 dx_2 dx_3 \cdots,$$

if the series converges. The series is guaranteed to converge if $$\lim sup_{n \to \infty} \sqrt[n]{\|K^n\|} < 1.$$

As described in the Grabenstein application, an approximation of the unknown function "f" is obtained as follows. Defining the Heaviside function $\Theta(x)$ as $$\Theta(x) = \begin{cases} 1, & \text{for } x > 0 \\ 0, & \text{for } x \leq 0, \end{cases} \qquad (3)$$

which will be referred to as a "Russian Roulette operator," the "n-th" estimate of equation (2) is given by $$f_{kls,RR}^{(n)} = g(x) + \Theta(K(x, \xi_1^{(n)}) - \xi_1'^{(n)}) g(\xi_1^{(n)}) + \qquad (4)$$
$$\Theta(K(x, \xi_1^{(n)}) - \xi_1'^{(n)}) \Theta(K(\xi_1^{(n)}, \xi_2^{(n)}) - \xi_2'^{(n)}) g(\xi_2^{(n)}) +$$
$$\Theta(K(x, \xi_1^{(n)}) - \xi_1'^{(n)}) \Theta(K(\xi_1^{(n)}, \xi_2^{(n)}) -$$
$$\xi_2'^{(n)}) \Theta(K(\xi_2^{(n)}, \xi_3^{(n)}) - \xi_3'^{(n)}) g(\xi_3^{(n)}) + \cdots,$$

where $\xi_1^{(n)}, \ldots, \xi_L^{(n)}$ and $\xi'_1^{(n)}, \ldots, \xi'_L^{(n)}$ comprise "s"-dimensional low-discrepancy sequences, such as Halton sequences, which provide sample points in the s-dimensional unit cube $[1,0)^s$ for the respective estimation. Halton sequences are described in the Grabenstein application. The series in equation (4), which corresponds to equation (27) in the Grabenstein application, is used in connection with ray tracing in the direction from the image toward the light source(s), which is sometimes referred to as eye-to-light source ray tracing, where the image to be rendered simulates the image of a scene as would be seen by the eye of a person viewing the scene. In equation (4), the first summand of the series on the right-hand side (that is, the "g(x)" term) represents ambient illumination, the next summand (that is, the first "$\Theta$" term) represents direct illumination, the next summand represents depth one reflection or refraction in the direction from the eye toward the light source, the next summand represents depth two reflection or refraction in the direction from the eye toward the light source, and so forth. The Russian Roulette operator essentially operates as a Russian Roulette check, and will guarantee that the series in equation (4) will eventually terminate at some summand, since eventually the value of one of the Russian Roulette operators $\Theta$ will equal zero, and that Russian Roulette operator $\Theta$ would also be in all subsequent terms of the series. Note that, in equation (4)

(i) each Russian Roulette check requires the evaluation of the kernel "K" at "x" and, respectively, $\xi_1^{(n)}, \ldots, \xi_L^{(n)}$, and (ii) for the respective summands in equation (18), the value of function "g" that multiplies $\Theta$ in the summands is evaluated at different sample points $\xi_1^{(n)}, \ldots, \xi_L^{(n)}$.

As an alternative, if instead of using the image-to-light source ray tracing, the ray tracing is performed from the light source toward the image (which is sometimes referred to as light-to-eye ray tracing), the "n-th" estimation can be performed such that the value of the function "g" that multiply the Russian Roulette operator $\Theta$ in the summands is evaluated at one sample point, namely $\xi_1^{(n)}$. In light source-to-eye ray tracing, instead of equation (2), the unknown function "f" can be obtained as $$f(x) = g(x) + \int_0^1 K(x, x_1)g(x_1)dx_1 + \qquad (5)$$

$$\int_0^1 \int_0^1 K(x, x_2)K(x_2, x_1)g(x_1)dx_1 dx_2 +$$

$$\int_0^1 \int_0^1 \int_0^1 K(x, x_3)K(x_3, x_2)K(x_2, x_1)g(x_1)dx_1 dx_2 dx_3 \cdots,$$

which, in turn, can be estimated using $$\overline{f}^{(n)}_{lds,RR}(x) = \qquad (6)$$

$$g(x) + K(x, \xi_1^{(n)})g(\xi_1^{(n)}) + K(x, \xi_2^{(n)})\Theta(K(\xi_2^{(n)}, \xi_1^{(n)}) - \xi_1'^{(n)})g(\xi_1^{(n)}) +$$

$$K(x, \xi_3^{(n)})\Theta(K(\xi_3^{(n)}, \xi_2^{(n)}) - \xi_2'^{(n)})\Theta(K(\xi_2^{(n)}, \xi_1^{(n)}) - \xi_1'^{(n)})g(\xi_1^{(n)}) + \cdots.$$

As with equation (4), the first summand of the series on the right-hand side (that is, the "g(x)" term) represents ambient illumination, and the next summand (that is, the first "$\Theta$" term) represents direct illumination. In contrast with equation (4), the next summand represents depth one reflection or refraction in the direction from the light source toward the eye, the next summand represents depth two reflection or refraction in the direction from the light source toward the eye, and so forth. As with equation (4), the series in equation (6) will truncate since eventually the value of one of the Russian Roulette operators $\Theta$ will equal zero, and that Russian Roulette operator $\Theta$ would also be in all subsequent terms of the series. A comparison of equation (6) with equation (4) reveals that (i) since the top line in equation (6) does not involve a Russian Roulette check, one fewer Russian Roulette check will typically be required than in equation (4); and (ii) function "g" need only be evaluated at one sample point, namely, $\xi_1^{(n)}$, reducing the amount of processing time required to generate each summand.

The methodology described above in connection with equations (1) through (6) generally assumes that the color is monochromatic. The invention provides an improved Russian Roulette methodology that allows for use in connection with a variety of colors and characteristics of surfaces of objects in the scene.

SUMMARY OF THE INVENTION

The invention provides a new and improved system and method for generating pixel values for pixels in an image being rendered using strictly-deterministic low-discrepancy sequences to provide sample points for generating estimates of values of integrals representing the pixel values.

In brief summary, the invention in one aspect provides a computer graphics system for generating a pixel value for a pixel in an image, the pixel being representative of a point $\vec{x}$ in a scene. The computer graphics system generates the pixel value to simulate global illumination for a plurality of colors, global illumination being represented by an evaluation of a function $f(x)$, the function $f(x)$ having the form $$f(x) = g(x) + \int_0^1 K(x, y)f(y)dy,$$

where $f(x)$ (and similarly $f(y)$) is an unknown function, and $g(x)$ and $K(x,y)$ are known functions, with $K(x,y)$ serving as a "kernel" of the integral, the kernel $K(x,y)$ including a function associated with at least two colors. The computer graphics system comprises an estimator generator module, a luminance value module and a pixel value generator. The estimator generator module is configured to generate a selected number "N" of estimators $\overline{f}^{(n)}_{lds,RR}(x)$ as $$\overline{f}^{(n)}_{lds,RR}(x) = g(x) + K(x, \xi_1^{(n)})S_1^{(n)} + K(x, \xi_2^{(n)})S_2^{(n)} + K(x, \xi_3^{(n)})S_3^{(n)} + \cdots,$$

where $S_1^{(n)}$ are defined recursively as $$S_1^{(n)} := g(\xi_1^{(n)}),$$

$$S_{j+1}^{(n)} := \frac{\Theta\left(M_{K(\xi_{j+1}^n, \xi_j^{(n)}), S_j^{(n)}} - \xi_j'^{(n)}\right)}{M_{K(\xi_{j+1}^n, \xi_j^{(n)}), S_j^{(n)}}} K(\xi_{j+1}^n, \xi_j^n) S_j^{(n)},$$

with $$M_{A,B} := \begin{cases} \dfrac{\int_0^\infty A_\lambda B_\lambda d\lambda}{\int_0^\infty B_\lambda d\lambda}, & \text{if } \int_0^\infty B_\lambda d\lambda > 0 \\ 0, & \text{if } \int_0^\infty B_\lambda d\lambda = 0, \end{cases}$$

and where $\Theta(x)$ represents the Heaviside function, and $\xi_1^{(n)}, \xi'_1^{(n)}, \xi_2^{(n)}, \xi'_2^{(n)}, \ldots, \xi_L^{(n)}, \xi'_L^{(n)}$, represent components of a predetermined multi-dimensional strictly deterministic low-discrepancy sequence and where "n" denotes a sequence index, the estimator generator generating successive terms for each estimator $\overline{f}^{(n)}_{lds,RR}(x)$ until it generates a term having the value zero. The luminance value module is configured to generate a luminance value for the point in the scene as the average of said estimator values generated by said estimator generator module. The pixel value generator module is configured to use the luminance value generated for the point in the scene in generating the pixel value.

In another aspect, the invention provides a computer graphics system for generating a pixel value for a pixel in an image, the pixel being representative of a point $\vec{x}$ in a scene. The computer graphics system generates the pixel value to simulate global illumination for a plurality of colors, global illumination being represented by an evaluation of a function $f(x)$ over a sphere centered at the point in the scene, the function $f(x)$ having the form $$f(x) = g(x) + \int_0^1 K(x, y)f(y)dy,$$

where $f(x)$ (and similarly $f(y)$) is an unknown function, and $g(x)$ and $K(x,y)$ are known functions, with $K(x,y)$ serving as a "kernel" of the integral, the kernel $K(x,y)$ including a function associated with at least two colors. The computer graphics system comprises an estimator generator module, a luminance value module and a pixel value generator. The estimator generator module is configured to generate a selected number "N" of estimators $f^{(n)}_{lds,RR}(x)$ as $$f^{(n)}_{lds,RR}(x) = g(x) + T^{(n)}_1(x)g(\xi^{(n)}_1) + T^{(n)}_2(x)g(\xi^{(n)}_2) + T^{(n)}_3(x)g(\xi^{(n)}_3) + \cdots,$$

where $S^{(n)}_i$ are defined recursively as $$T^{(n)}_1(x) := \frac{\Theta\left(M_{K(x,\xi^{(n)}_1),1} - \xi'^{(n)}_1\right)}{M_{K(x,\xi^{(n)}_1),1}} K(x, \xi^{(n)}_1),$$

$$T^{(n)}_{j+1}(x) := \frac{\Theta\left(M_{K(\xi^{(n)}_j,\xi^{(n)}_{j+1}),T^{(n)}_j(x)} - \xi'^{(n)}_{j+1}\right)}{M_{K(\xi^{(n)}_j,\xi^{(n)}_{j+1}),T^{(n)}_j(x)}} K(\xi^{(n)}_j, \xi^{(n)}_{j+1})$$

with $$M_{A,B} := \begin{cases} \dfrac{\int_0^\infty A_\lambda B_\lambda d\lambda}{\int_0^\infty B_\lambda d\lambda}, & \text{if } \int_0^\infty B_\lambda d\lambda > 0 \\ 0, & \text{if } \int_0^\infty B_\lambda d\lambda = 0, \end{cases}$$

and where $\Theta(x)$ represents the Heaviside function, and $\xi^{(n)}_1$, $\xi'^{(n)}_1$, $\xi^{(n)}_2$, $\xi'^{(n)}_2$, ..., $\xi^{(n)}_L$, $\xi'^{(n)}_L$, represent components of a predetermined multi-dimensional strictly deterministic low-discrepancy sequence and where "n" denotes a sequence index, the estimator generator generating successive terms for each estimator $f^{(n)}_{lds,RR}(x)$ until it generates a term having the value zero. The luminance value generator is configured to generate a luminance value for the point in the scene as the average of said estimator values generated by said estimator generator module. The pixel value generator module is configured to use the luminance value generated for the point in the scene in generating the pixel value.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
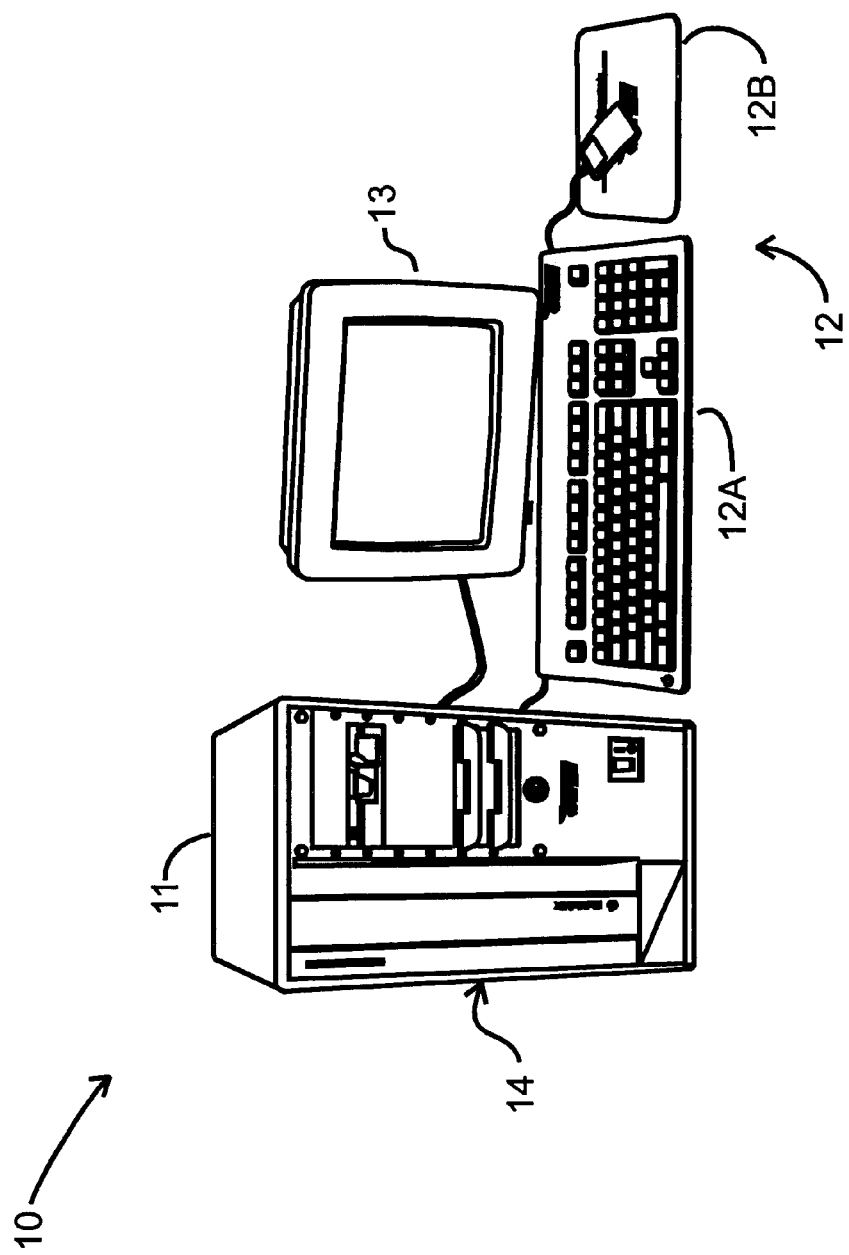
FIG. 1 depicts an illustrative computer graphics system constructed in accordance with the invention.

The invention provides a computer graphic system and method for generating pixel values for pixels in an image of a scene, which makes use of a global illumination methodology that allows for use in connection with a variety of colors and characteristics of surfaces of objects in the scene. FIG. 1 attached hereto depicts an illustrative computer system 10 that makes use of such a global illumination methodology. With reference to FIG. 1, the computer system 10 in one embodiment includes a processor module 11 and operator interface elements comprising operator input components such,as a keyboard 12A and/or a mouse 12B (generally identified as operator input element(s) 12) and an operator output element such as a video display device 13. The illustrative computer system 10 is of the conventional stored-program computer architecture. The processor module 11 includes, for example, one or more processor, memory and mass storage devices, such as disk and/or tape storage elements (not separately shown), which perform processing and storage operations in connection with digital data provided thereto. If the processor module 11 includes a plurality of processor devices, the respective processor devices may be configured to process various portions of a single task in parallel, in which case the task may be executed more quickly than otherwise. The operator input element(s) 12 are provided to permit an operator to input information for processing. The video display device 13 is provided to display output information generated by the processor module 11 on a screen 14 to the operator, including data that the operator may input for processing, information that the operator may input to control processing, as well as information generated during processing. The processor module 11 generates information for display by the video display device 13 using a so-called "graphical user interface" ("GUI"), in which information for various applications programs is displayed using various "windows." Although the computer system 10 is shown as comprising particular components, such as the keyboard 12A and mouse 12B for receiving input information from an operator, and a video display device 13 for displaying output information to the operator, it will be appreciated that the computer system 10 may include a variety of components in addition to or instead of those depicted in FIG. 1.

In addition, the processor module 11 includes one or more network ports, generally identified by reference numeral 14, which are connected to communication links which connect the computer system 10 in a computer network. The network ports enable the computer system 10 to transmit information to, and receive information from, other computer systems and other devices in the network. In a typical network organized according to, for example, the client-server paradigm, certain computer systems in the network are designated as servers, which store data and programs (generally, "information") for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

The invention provides an improved Russian Roulette methodology to provide for multichromatic color and various surface characteristics, such as glossy, diffuse and specular, of objects in a scene, in an image rendered using the global illumination methodology. As noted above, global illumination involves solving a "rendering equation," which has a general form $$f(x) = g(x) + \int_0^1 K(x, y) f(y) dy, \quad (13)$$

were "g" and kernel "K" are known functions and "$f$" is an unknown function. Generally the luminance of a particular color can be represented as an integral over a spectrum with a weight $$I_\lambda := \int_0^\infty I_\lambda y_\lambda d\lambda,$$

where "$\lambda$" refers to wavelength and "$y_\lambda$" refers to the spectral radiance, that is, the radiant flux, at wavelength $\lambda$, per unit wavelength interval and "$I_\lambda$" is the photopic spectral luminous efficiency, which is a weight with which the human eye perceives light having the respective wavelength $\lambda$. For convenience, it will be assumed that $$\int_0^\infty I_\lambda d\lambda = 1,$$

that is, that the luminance over the entire spectrum is normalized. In practice, typically the luminance intensity "I," instead of being a continuous function of wavelength $\lambda$, is represented by a predetermined set of color channels. Typically three channels, such as separate red, blue, and green channels, are used. In that case, the luminance intensity "I" can be written in the form $I = c_r \delta_r + c_g \delta_g + c_b \delta_b$, where "$c_r$," "$c_g$," and "$c_b$" are coefficients that are used for the respective color channels by a particular standard (subscripts "r," "g" and "b" may represent "red," "green" and "blue," respectively, or any other set of colors that is selected for use by the standard), and "$\delta_r$," "$\delta_g$" and "$\delta_b$" are delta functions having the value "one" if a color associated with the respective color channel is present, and otherwise "zero."

An intensity change factor $M_{A,B}$ for a functional B by applying another functional A is defined as $$M_{A,B} := \begin{cases} \dfrac{\int_0^\infty A_\lambda B_\lambda d\lambda}{\int_0^\infty B_\lambda d\lambda}, & \text{if } \int_0^\infty B_\lambda d\lambda > 0 \\ 0, & \text{if } \int_0^\infty B_\lambda d\lambda = 0, \end{cases} \quad (14)$$

where "A" in equation (8) will constitute the kernel "K" (reference equation (7)) at points (x,y). Under the assumption that the value of the norm of K is less than or equal to "one," which, in computer graphics, will represent the fact that the energy of a photon does not increase after the photon is emitted by the light source(s), $M_{K(x,y),B} \leq 1$ for all (x,y). If "B" is also a function of "y", that is, B=t(y), as is the case with "$f(y)$" in equation (7), then $$K(x, y) t(y) = \int_0^1 \left( \frac{K(x, y) t(y)}{M_{K(x,y),t(y)}} \Theta(M_{K(x,y),t(y)} - \varsigma) \right) d\varsigma \quad (15)$$

Defining recursively $$S_1^{(n)} := g(\xi_1^{(n)}), \quad (16)$$

$$S_{j+1}^{(n)} := \frac{\Theta\left(M_{K(\xi_{j+1}^n, \xi_j^n), S_j^{(n)}} - \xi_j'^{(n)}\right)}{M_{K(\xi_{j+1}^n, \xi_j^n), S_j^{(n)}}} K(\xi_{j+1}^n, \xi_j^n) S_j^{(n)}$$

and using equation (9), equation (6), the equation for estimating the evaluation of equation (15) for light source-to-eye ray tracing, can be generalized to accommodate a color spectrum as $$\overline{f}_{lds,RR}^{(n)}(x) = g(x) + K(x, \xi_1^{(n)}) S_1^{(n)} + K(x, \xi_2^{(n)}) S_2^{(n)} + K(x, \xi_3^{(n)}) S_3^{(n)} + \cdots. \quad (17)$$

Equation (11) is a generalization of equation (6), with the kernel "K" adjusting the color spectrum, while keeping the luminance intensity constant. For monochromatic images, the value of $$M_{K(\xi_{j+1}^{(n)}, \xi_j^{(n)}), S_j^{(n)}}$$

in equation (21) corresponds to $$K(\xi_{j+1}^{(n)}, \xi_j^{(n)}),$$

in which case $$S_{j+1}^{(n)} = \Theta(K(\xi_{j+1}^{(n)}, \xi_j^{(n)}) - \xi_j'^{(n)}) g(\xi_1^{(n)})$$

and equation (11) reduces to equation (6). The $S_j^{(n)}$ multipliers in the summands in equation (11) essentially represent descriptions of the flux of photons that are to be incident on a surface of an object in a scene, prior to their interaction with a respective surface of an object in the scene onto which they are incident. The $K(x, \xi_j^{(n)})$ multiplicands, in turn, represent the interactions of the photon flux with the respective surface, in particular how the respective surface reflects, absorbs, blocks, and so forth, respective ones of the photons of the various wavelengths that comprise the flux that is incident on the respective surface.

As noted above, equations (8) through (11) assume that the norm of kernel "K" is less than or equal to one. It will be appreciated that, if the value of the norm of the kernel "K" is not less than or equal to "one," that is, if $$M_{K(\xi_{j+1}^{(n)}, \xi_j^{(n)}), S_j^{(n)}} > 1$$

for at least one set of values of "j" and "n,"

$$M_{K(\xi_{j+1}^{(n)}, \xi_j^{(n)}), S_j^{(n)}}$$

can be split into two branches $$\left[ M_{K(\xi_{j+1}^{(n)}, \xi_j^{(n)}), S_j^{(n)}} \right] \text{ or } \left[ M_{K(\xi_{j+1}^{(n)}, \xi_j^{(n)}), S_j^{(n)}} + 1 \right]$$

using $$\Theta\left(M_{K(\xi_{j+1}^{(n)},\varepsilon_j^{(n)}),S_j^{(n)}} - \left\lfloor M_{K(\xi_{j+1}^{(n)},\varepsilon_j^{(n)}),S_j^{(n)}} \right\rfloor - \zeta^{(n)}\right), \quad (18)$$

for some splitting control value $\zeta^{(n)}$, to control the branching decision.

Equation (4), which is used in estimating the evaluation of equation (1) for eye-to-light source ray tracing, can be generalized to accommodate a color spectrum in a similar way. Defining recursively $$T_1^{(n)}(x) := \frac{\Theta\left(M_{K(x,\varepsilon_1^{(n)}),1} - \xi_1'^{(n)}\right)}{M_{K(x,\varepsilon_1^{(n)}),1}} K(x, \xi_1^{(n)}) \quad (19)$$

$$T_{j+1}^{(n)}(x) := \frac{\Theta\left(M_{K(\xi_j^{(n)},\varepsilon_{j+1}^{(n)}),T_j^{(n)}(x)} - \xi_{j+1}'^{(n)}\right)}{M_{K(\xi_j^{(n)},\varepsilon_{j+1}^{(n)}),T_j^{(n)}(x)}} K(\xi_j^{(n)}, \xi_{j+1}^{(n)})$$

equation (4) is generalized as $$f_{lds,RR}^{(n)}(x) = g(x) + T_1^{(n)}(x)g(\xi_1^{(n)}) + T_2^{(n)}(x)g(\xi_2^{(n)}) + T_3^{(n)}(x)g(\xi_3^{(n)}) + \cdots. \quad (20)$$

Equation (14) reduces to equation (4) in a manner similar to the way in which equation (11) reduces to equation (6) in the monochromatic case. In comparison with equation (11), the $g(\xi_j^{(n)})$ multipliers in the summands in equation (14) essentially represent descriptions of the flux of photons that are to be incident on a surface of an object in a scene, prior to their interaction with a respective surface of an object in the scene onto which they are incident. The $T_j^{(n)}$ in turn, represent the interactions of the photon flux with the respective surface, in particular how the respective surface reflects, absorbs, blocks, and so forth, respective ones of the photons of the various wavelengths that comprise the flux that is incident on the respective surface.

Accordingly, the computer graphics system 10 can use equation (11) to approximate the evaluation the global illumination rendering equation (equation (7)) in connection with light source ray-to-eye tracing to render an image of a scene, or equation (14) to approximate the evaluation of the global illumination rendering equation in connection with eye-to-light source ray tracing.

In addition to accommodating a color spectrum, the improved Russian Roulette methodology also accommodate other types of characteristics for the surfaces defining the objects in the scene. As an illustration of this, it will be assumed that a surface can be diffuse, glossy or specular, or any combination thereof. The total photon flux that is incident on a surface is represented by "$f$," and, if "d," "g" and "s" are functions that define the diffuseness, glossiness and specularity of the surface, respectively, the photon flux that is reflected by the surface will comprise three components, namely, a diffuse component "$f \cdot d$," a glossy component "$f \cdot g$" and a specular component "$f \cdot s$." Generally, the values of "$f$," "d," "g" and "s" can be functions of the wavelength $\lambda$ of the incident photon flux, and the condition that the value of the norm of the kernel "K" not be greater than "one" requires that $d_\lambda + g_\lambda + s_\lambda \leq 1$ for all wavelengths $\lambda$. In that case, according to the Russian Roulette methodology, a photon's tracing path will be continued if, for the corresponding sample point $=\xi_j'^{(n)}$, $$\varsigma < \frac{\int_0^\infty I_\lambda f_\lambda (d_\lambda + g_\lambda + s_\lambda) d\lambda}{\int_0^\infty I_\lambda f_\lambda d\lambda} \quad (21)$$

The same sample point $\zeta$ can be used to obtain a decision as to which of the interaction types is to be evaluated according to:

$$\begin{cases} 0 \leq \varsigma < \dfrac{\int_0^\infty I_\lambda f_\lambda d_\lambda d\lambda}{\int_0^\infty I_\lambda f_\lambda d\lambda} & \text{diffuse,} \quad \text{flux } fd \dfrac{\int_0^\infty I_\lambda f_\lambda d\lambda}{\int_0^\infty I_\lambda f_\lambda d_\lambda d\lambda} \\[2ex] \dfrac{\int_0^\infty I_\lambda f_\lambda d_\lambda d\lambda}{\int_0^\infty I_\lambda f_\lambda d\lambda} \leq \varsigma < \dfrac{\int_0^\infty I_\lambda f_\lambda (d_\lambda + g_\lambda) d\lambda}{\int_0^\infty I_\lambda f_\lambda d\lambda} & \text{glossy,} \quad \text{flux } fg \dfrac{\int_0^\infty I_\lambda f_\lambda d\lambda}{\int_0^\infty I_\lambda f_\lambda g_\lambda d\lambda} \\[2ex] \dfrac{\int_0^\infty I_\lambda f_\lambda (d_\lambda + g_\lambda) d\lambda}{\int_0^\infty I_\lambda f_\lambda d\lambda} \leq \varsigma < & \text{specular,} \quad \text{flux } fs \dfrac{\int_0^\infty I_\lambda f_\lambda d\lambda}{\int_0^\infty I_\lambda f_\lambda s_\lambda d\lambda} \\[2ex] \dfrac{\int_0^\infty I_\lambda f_\lambda (d_\lambda + g_\lambda + s_\lambda) d\lambda}{\int_0^\infty I_\lambda f_\lambda d\lambda} & \end{cases} \quad (22)$$

It will be appreciated that the particular order of diffuse, glossy and specular as appears in the respective lines of equation (16) may differ from the order in which they appear above. For example, instead of associating the diffuse interaction type and "$d_\lambda$" with the first line, the first line could be associated with the glossy interaction type and "$g_\lambda$," or the specular interaction type and "$s_\lambda$" and similarly with the second and third lines. Extensions to other interaction types, in addition to or instead of the three described here, will be apparent to those skilled in the art.

As noted above, color is typically represented by three color channels, such as separate red, blue, and green channels. If the colors are given as $f=(f_r, f_g, f_b)$, with "$f_r$," "$f_g$," and "$f_b$," representing the fluxes for the respective red, green and blue colors, and functions "d," "g" and "s" are functions of the respective red, green and blue colors, $d=(d_r, d_g, d_b)$, $g=(g_r, g_g, g_b)$, and $s=(s_r, s_g, s_b)$, the integrals in equation (16) are simply sums, such as, for example $$\int_0^\infty I_\lambda f_\lambda d_\lambda d\lambda = c_r f_r d_r + c_g f_g d_g + c_b f_b d_b, \quad (23)$$

and $$\int_0^\infty I_\lambda f_\lambda d\lambda = c_r f_r + c_g f_g + c_b f_b, \quad (24)$$

where "$c_r$," "$c_g$," and "$c_b$" are the color coefficients as defined above.

The invention provides computer graphics system 10 that makes use of an improved Russian Roulette methodology that can provide for multichromatic color and various surface characteristics, such as glossy, diffuse and specular, of objects in a scene, in an image rendered using the global illumination methodology.

It will be appreciated that numerous modifications may be made to the arrangement described herein. For example, although the arrangement has been described as making use of three color channels, namely, red, green and blue, it will be appreciated that other colors may be used in addition to or instead of the three referenced here. In addition, although the arrangement has been described as making use of three types of surface characteristics, namely, diffuse, glossy and specular, it will be appreciated that other types of characteristics may be used in addition to or instead of the three referenced here.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A computer graphics system for generating a pixel value for a pixel in an image, the pixel being representative of a point $\vec{x}$ in a scene, the computer graphics system generating the pixel value to simulate global illumination for a plurality of colors, global illumination being represented by an evaluation of a function $f(x)$, the function $f(x)$ having the form $$f(x) = g(x) + \int_0^1 K(x,y) f(y) dy,$$

where $f(x)$ (and similarly $f(y)$) is an unknown function, and $g(x)$ and $K(x,y)$ are known functions, with $K(x,y)$ serving as a "kernel" of the integral, the kernel $K(x,y)$ including a function associated with at least two colors, the computer graphics system comprising:

A. an estimator generator module configured to generate a selected number "N" of estimators $\overline{f}^{(n)}_{lds,RR}(x)$ as $$\overline{f}^{(n)}_{lds,RR}(x) = g(x) + K(x, \xi_1^{(n)}) S_1^{(n)} + K(x, \xi_2^{(n)}) S_2^{(n)} + K(x, \xi_3^{(n)}) S_3^{(n)} + \cdots,$$

where $S_i^{(n)}$ are defined recursively as $$S_1^{(n)} := g(\xi_1^{(n)}),$$

$$S_{j+1}^{(n)} := \frac{\Theta\left(M_{K(\xi_{j+1}^n, \xi_j^n), S_j^{(n)}} - \xi_j^{'(n)}\right)}{M_{K(\xi_{j+1}^n, \xi_j^n), S_j^{(n)}}} K(\xi_{j+1}^n, \xi_j^n) S_j^{(n)},$$

with $$M_{A,B} := \begin{cases} \dfrac{\int_0^\infty A_\lambda B_\lambda d\lambda}{\int_0^\infty B_\lambda d\lambda}, & \text{if } \int_0^\infty B_\lambda d\lambda > 0 \\ 0, & \text{if } \int_0^\infty B_\lambda d\lambda = 0, \end{cases}$$

and where $\Theta(x)$ represents the Heaviside function, and $\xi_1^{(n)}, \xi_1^{'(n)}, \xi_2^{(n)}, \xi_2^{'(n)}, \ldots, \xi_L^{(n)}, \xi_L^{'(n)}$, represent components of a predetermined multi-dimensional strictly deterministic low-discrepancy sequence and where "n" denotes a sequence index, the estimator generator module being configured to generate successive terms for each estimator $f^{(n)}_{lds,RR}(x)$ until it generates a term having the value zero;

B. a luminance value module configured to generate a luminance value for the point in the scene as the average of said estimator values generated by said estimator generator module; and C. a pixel value generator module configured to use the luminance value generated for the point in the scene in generating the pixel value.

2. A computer graphics system as defined in claim 1 in which the kernel $K(x,y)$ further includes a function of at least one type of surface characteristic of a surface in the scene, the estimator generator module being configured to generate the estimator $f^{(n)}_{lds,RR}(x)$ in relation to the at least one surface characteristic.

3. A computer graphics system as defined in claim 2 in which the estimator generator module is configured to generate the estimator $\overline{f}^{(n)}_{lds,RR}(x)$ in relation to at least one photon, the estimator generator module being configured to determine whether the at least one photon's path will be continued in relation to $$\zeta < \frac{\int_0^\infty I_\lambda f_\lambda c_\lambda d\lambda}{\int_0^\infty I_\lambda f_\lambda d\lambda},$$

where $I_\lambda$ is a weighting value as a function with which the human eye perceives light having the respective wavelength $\lambda$, $f_\lambda$ is the flux of the at least one photon per wavelength $\lambda$, $c_\lambda$ is a function of the respective surface characteristic type as a function of the wavelength $\lambda$, and $\zeta$ is a selected value.

4. A computer graphics system as defined in claim 3 in which $\zeta$ is a function of $\xi_j^{'(n)}$.

5. A computer graphics system as defined in claim 3 in which the estimator generator module is configured to generate the estimator in relation to a plurality of surface characteristic types, each represented by a function, $c_\lambda$ being a sum of the respective functions.

6. A computer graphics system as defined in claim 5 in which the estimator generator module is further configured to generate the estimator $f^{(n)}_{ldr,RR}(x)$ in relation to an interaction type, the interactio type being related to the respective surface characteristic types.

7. A computer graphics system as defined in claim 6 in which the estimator generator module is configured to generate the estimator $f^{(n)}_{lds,RR}(x)$ in relation to $$\begin{cases} 0 \leq \zeta < \dfrac{\int_0^\infty I_\lambda f_\lambda d_\lambda d\lambda}{\int_0^\infty I_\lambda f_\lambda d\lambda} & \text{flux } fd \dfrac{\int_0^\infty I_\lambda f_\lambda d\lambda}{\int_0^\infty I_\lambda f_\lambda d_\lambda d\lambda} \\[2ex] \dfrac{\int_0^\infty I_\lambda f_\lambda d_\lambda d\lambda}{\int_0^\infty I_\lambda f_\lambda d\lambda} \leq \zeta < \dfrac{\int_0^\infty I_\lambda f_\lambda (d_\lambda + g_\lambda) d\lambda}{\int_0^\infty I_\lambda f_\lambda d\lambda} & \text{flux } fg \dfrac{\int_0^\infty I_\lambda f_\lambda d\lambda}{\int_0^\infty I_\lambda f_\lambda g_\lambda d\lambda} \\[2ex] \dfrac{\int_0^\infty I_\lambda f_\lambda (d_\lambda + g_\lambda) d\lambda}{\int_0^\infty I_\lambda f_\lambda d\lambda} \leq \zeta < & \text{flux } fs \dfrac{\int_0^\infty I_\lambda f_\lambda d\lambda}{\int_0^\infty I_\lambda f_\lambda s_\lambda d\lambda} \\[2ex] \dfrac{\int_0^\infty I_\lambda f_\lambda (d_\lambda + g_\lambda + s_\lambda) d\lambda}{\int_0^\infty I_\lambda f_\lambda d\lambda} \\ \cdots, \end{cases}$$

for respective surface characteristic types associated with respective functions $d_\lambda$, $g_\lambda$, $s_\lambda$, ....

8. A computer graphics system for generating a pixel value for a pixel in an image, the pixel being representative of a point $\vec{x}$ in a scene, the computer graphics system generating the pixel value to simulate global illumination for a plurality of colors, global illumination being represented by an evaluation of a function $f(x)$, the function $f(x)$ having the form $$f(x) = g(x) + \int_0^1 K(x,y) f(y) dy,$$

where $f(x)$ (and similarly $f(y)$) is an unknown function, and $g(x)$ and $K(x,y)$ are known functions, with $K(x,y)$ serving as a "kernel" of the integral, the kernel $K(x,y)$ including a function associated with at least two colors, the computer graphics system comprising:

A. an estimator generator module configured to generate a selected number "N" of estimators $f^{(n)}_{lds,RR}(x)$ as $$f^{(n)}_{lds,RR}(x) = g(x) + T_1^{(n)}(x) g(\xi_1^{(n)}) + T_2^{(n)}(x) g(\xi_2^{(n)}) + T_3^{(n)}(x) g(\xi_3^{(n)}) + \cdots,$$

where $S_i^{(n)}$ are defined recursively as $$T_1^{(n)}(x) := \frac{\Theta\left(M_{K(x,\xi_1^{(n)}),1} - \xi_1'^{(n)}\right)}{M_{K(x,\xi_1^{(n)}),1}} K(x, \xi_1^{(n)})$$

$$T_{j+1}^{(n)}(x) := \frac{\Theta\left(M_{K(\xi_j^{(n)},\xi_{j+1}^{(n)}),T_j^{(n)}(x)} - \xi_{j+1}'^{(n)}\right)}{M_{K(\xi_j^{(n)},\xi_{j+1}^{(n)}),T_j^{(n)}(x)}} K(\xi_j^{(n)}, \xi_{j+1}^{(n)}),$$

with $$M_{A,B} := \begin{cases} \dfrac{\int_0^\infty A_\lambda B_\lambda d\lambda}{\int_0^\infty B_\lambda d\lambda}, & \text{if } \int_0^\infty B_\lambda d\lambda > 0 \\ 0, & \text{if } \int_0^\infty B_\lambda d\lambda = 0, \end{cases}$$

and where $\Theta(x)$ represents the Heaviside function, and $\xi_1^{(n)}, \xi_1'^{(n)}, \xi_2^{(n)}, \xi_2'^{(n)}, \ldots, \xi_L^{(n)}, \xi_L'^{(n)}$, represent components of a predetermined multi-dimensional strictly deterministic low-discrepancy sequence and where "n" denotes a sequence index, the estimator generator module being configured to generate successive terms for each estimator $f^{(n)}_{lds,RR}(x)$ until it generates a term having the value zero;

B. a luminance value generator configured to generate a luminance value for the point in the scene as the average of said estimator values generated by said estimator generator module; and C. a pixel value generator module configured to use the luminance value generated for the point in the scene in generating the pixel value.

9. A computer graphics system as defined in claim 8 in which the kernel $K(x,y)$ further includes a function of at least one type of surface characteristic of a surface in the scene, the estimator generator module being configured to generate the estimator $f^{(n)}_{lds,RR}(x)$ in relation to the at least one surface characteristic.

10. A computer graphics system as defined in claim 9 in which the estimator generator module is configured to generate the estimator $f^{(n)}_{lds,RR}(x)$ in relation to at least one photon, the estimator generator module being configured to determine whether the at least one photon's path will be continued in relation to $$\varsigma < \frac{\int_0^\infty I_\lambda f_\lambda c_\lambda d\lambda}{\int_0^\infty I_\lambda f_\lambda d\lambda},$$

where $I_\lambda$ is a weighting value as a function with which the human eye perceives light having the respective wavelength $\lambda$, $f_\lambda$ is the flux of the at least one photon per wavelength $\lambda$, $c_\lambda$ is a function of the respective surface characteristic type as a function of the wavelength $\lambda$, and $\varsigma$ is a selected value.

11. A computer graphics system as defined in claim 10 in which $\varsigma$ is a function of $\xi_j'^{(n)}$.

12. A computer graphics system as defined in claim 10 in which the estimator generator module is configured to generate the estimator in relation to a plurality of surface characteristic types, each represented by a function, $c_\lambda$ being a sum of the respective functions.

13. A computer graphics system as defined in claim 12 in which the estimator generator module is further configured to generate the estimator $f^{(n)}_{ldr,RR}(x)$ in relation to an interaction type, the interaction type being related to the respective surface characteristic types.

14. A computer graphics system as defined in claim 13 in which the estimator generator module is configured to generate the estimator $f^{(n)}_{lds,RR}(x)$ in relation to $$\begin{cases} 0 \leq \varsigma < \dfrac{\int_0^\infty I_\lambda f_\lambda d_\lambda d\lambda}{\int_0^\infty I_\lambda f_\lambda d\lambda} & \text{flux } fd \dfrac{\int_0^\infty I_\lambda f_\lambda d\lambda}{\int_0^\infty I_\lambda f_\lambda d_\lambda d\lambda} \\[6pt] \dfrac{\int_0^\infty I_\lambda f_\lambda d_\lambda d\lambda}{\int_0^\infty I_\lambda f_\lambda d\lambda} \leq \varsigma < \dfrac{\int_0^\infty I_\lambda f_\lambda (d_\lambda + g_\lambda) d\lambda}{\int_0^\infty I_\lambda f_\lambda d\lambda} & \text{flux } fg \dfrac{\int_0^\infty I_\lambda f_\lambda d\lambda}{\int_0^\infty I_\lambda f_\lambda g_\lambda d\lambda} \\[6pt] \dfrac{\int_0^\infty I_\lambda f_\lambda (d_\lambda + g_\lambda) d\lambda}{\int_0^\infty I_\lambda f_\lambda d\lambda} \leq \varsigma < & \text{flux } fs \dfrac{\int_0^\infty I_\lambda f_\lambda d\lambda}{\int_0^\infty I_\lambda f_\lambda s_\lambda d\lambda} \\[6pt] \dfrac{\int_0^\infty I_\lambda f_\lambda (d_\lambda + g_\lambda + s_\lambda) d\lambda}{\int_0^\infty I_\lambda f_\lambda d\lambda} \\ \cdots, \end{cases}$$

for respective surface characteristic types associated with respective functions $d_\lambda, g_\lambda, s_\lambda, \ldots$ 15. A computer graphics method for generating a pixel value for a pixel in an image, the pixel being representative of a point $\vec{x}$ in a scene, the computer graphics method generating the pixel value to simulate global illumination for a plurality of colors, global illumination being represented by an evaluation of a function $f(x)$, the function $f(x)$ having the form $$f(x) = g(x) + \int_0^1 K(x,y) f(y) dy,$$

where $f(x)$ (and similarly $f(y)$) is an unknown function, and $g(x)$ and $K(x,y)$ are known functions, with $K(x,y)$ serving as a "kernel" of the integral, the kernel $K(x,y)$ including a function associated with at least two colors, the computer graphics method comprising:

A. an estimator generator step of generating a selected number "N" of estimators $\overline{f}^{(n)}_{lds,RR}(x)$ as $$\overline{f}^{(n)}_{lds,RR}(x) = g(x) + K(x, \xi_1^{(n)})S_1^{(n)} + K(x, \xi_2^{(n)})S_2^{(n)} + K(x, \xi_3^{(n)})S_3^{(n)} + \cdots,$$

where $S_i^{(n)}$ are defined recursively as $$S_1^{(n)} := g(\xi_1^{(n)}),$$

$$S_{j+1}^{(n)} := \frac{\Theta\left(M_{K(\xi_{j+1}^n, \xi_j^n), S_j^{(n)}} - \xi_j'^{(n)}\right)}{M_{K(\xi_{j+1}^n, \xi_j^n), S_j^{(n)}}} K(\xi_{j+1}^n, \xi_j^n)S_j^{(n)},$$

with $$M_{A,B} := \begin{cases} \frac{\int_0^\infty A_\lambda B_\lambda d\lambda}{\int_0^\infty B_\lambda d\lambda}, & \text{if } \int_0^\infty B_\lambda d\lambda > 0 \\ 0, & \text{if } \int_0^\infty B_\lambda d\lambda = 0, \end{cases}$$

and where $\Theta(x)$ represents the Heaviside function, and $\xi_1^{(n)}, \xi_1'^{(n)}, \xi_2^{(n)}, \xi_2'^{(n)}, \ldots, \xi_L^{(n)}, \xi_L'^{(n)}$, represent components of a predetermined multi-dimensional strictly deterministic low-discrepancy sequence and where "n" denotes a sequence index, the estimator generator step including the step of generating successive terms for each estimator $\overline{f}^{(n)}_{lds,RR}(x)$ until it generates a term having the value zero;

B. a luminance value generator step of generating a luminance value for the point in the scene as the average of said estimator values generated during said estimator generator step; and C. a pixel value generator step of using the luminance value generated for the point in the scene in generating the pixel value.

16. A computer graphics method as defined in claim 15 in which the kernel K(x,y) further includes a function of at least one type of surface characteristic of a surface in the scene, the estimator generator step including the step of generating the estimator $\overline{f}^{(n)}_{lds,RR}(x)$ in relation to the at least one surface characteristic.

17. A computer graphics method as defined in claim 16 in which the estimator generator step includes the step of generating the estimator $\overline{f}^{(n)}_{lds,RR}(x)$ in relation to at least one photon, the estimator generator step including the step of determining whether the at least one photon's path will be continued in relation to $$\varsigma < \frac{\int_0^\infty I_\lambda f_\lambda c_\lambda d\lambda}{\int_0^\infty I_\lambda f_\lambda d\lambda},$$

where $I_\lambda$ is a weighting value as a function with which the human eye perceives light having the respective wavelength $\lambda$, $f_\lambda$ is the flux of the at least one photon per wavelength $\lambda$, $c_\lambda$ is a function of the respective surface characteristic type as a function of the wavelength $\lambda$, and $\zeta$ is a selected value.

18. A computer graphics method as defined in claim 17 in which $\zeta$ is a function of $\xi_j'^{(n)}$.

19. A computer graphics method as defined in claim 17 in which the estimator generator step includes the step of generating the estimator in relation to a plurality of surface characteristic types, each represented by a function, $c_\lambda$ being a sum of the respective functions.

20. A computer graphics method as defined in claim 19 in which the estimator generator step includes the step of generating the estimator $\overline{f}^{(n)}_{ldr,RR}(x)$ in relation to an interaction type, the interaction type being related to the respective surface characteristic types.

21. A computer graphics method as defined in claim 20 in which the estimator generator step includes the step of generating the estimator $\overline{f}^{(n)}_{lds,RR}(x)$ in relation to $$\begin{cases} 0 \leq \varsigma < \frac{\int_0^\infty I_\lambda f_\lambda d_\lambda d\lambda}{\int_0^\infty I_\lambda f_\lambda d\lambda} & \text{flux } fd \frac{\int_0^\infty I_\lambda f_\lambda d\lambda}{\int_0^\infty I_\lambda f_\lambda d_\lambda d\lambda} \\ \frac{\int_0^\infty I_\lambda f_\lambda d_\lambda d\lambda}{\int_0^\infty I_\lambda f_\lambda d\lambda} \leq \varsigma < \frac{\int_0^\infty I_\lambda f_\lambda (d_\lambda + g_\lambda) d\lambda}{\int_0^\infty I_\lambda f_\lambda d\lambda} & \text{flux } fg \frac{\int_0^\infty I_\lambda f_\lambda d\lambda}{\int_0^\infty I_\lambda f_\lambda g_\lambda d\lambda} \\ \frac{\int_0^\infty I_\lambda f_\lambda (d_\lambda + g_\lambda) d\lambda}{\int_0^\infty I_\lambda f_\lambda d\lambda} \leq \varsigma < & \text{flux } fs \frac{\int_0^\infty I_\lambda f_\lambda d\lambda}{\int_0^\infty I_\lambda f_\lambda s_\lambda d\lambda} \\ \frac{\int_0^\infty I_\lambda f_\lambda (d_\lambda + g_\lambda + s_\lambda) d\lambda}{\int_0^\infty I_\lambda f_\lambda d\lambda} \\ \cdots, \end{cases}$$

for respective surface characteristic types associated with respective functions $d_\lambda, g_\lambda, s_\lambda, \ldots$.

22. A computer graphics method for generating a pixel value for a pixel in an image, the pixel being representative of a point $\vec{x}$ in a scene, the computer graphics method generating the pixel value to simulate global illumination for a plurality of colors, global illumination being represented by an evaluation of a function $f(x)$, the function $f(x)$ having the form $$f(x) = g(x) + \int_0^1 K(x,y)f(y)dy,$$

where $f(x)$ (and similarly $f(y)$) is an unknown function, and $g(x)$ and $K(x,y)$ are known functions, with $K(x,y)$ serving as a "kernel" of the integral, the kernel $K(x,y)$ including a function associated with at least two colors, the computer graphics method comprising:

A. an estimator generator step of generating a selected number "N" of estimators $\overline{f}^{(n)}_{lds,RR}(x)$ as $$f^{(n)}_{lds,RR}(x) = g(x) + T_1^{(n)}(x)g(\xi_1^{(n)}) + T_2^{(n)}(x)g(\xi_2^{(n)}) + T_3^{(n)}(x)g(\xi_3^{(n)}) + \cdots,$$

where $S_i^{(n)}$ are defined recursively as $$T_1^{(n)}(x) := \frac{\Theta\left(M_{K(x,\xi_1^{(n)}),1} - \xi_1'^{(n)}\right)}{M_{K(x,\xi_1^{(n)}),1}} K(x, \xi_1^{(n)}),$$

$$T_{j+1}^{(n)}(x) := \frac{\Theta\left(M_{K(\xi_j^{(n)}, \xi_{j+1}^{(n)}), T_j^{(n)}(x)} - \xi_{j+1}'^{(n)}\right)}{M_{K(\xi_j^{(n)}, \xi_{j+1}^{(n)}), T_j^{(n)}(x)}} K(\xi_j^{(n)}, \xi_{j+1}^{(n)})$$

with $$M_{A,B} := \begin{cases} \frac{\int_0^\infty A_\lambda B_\lambda d\lambda}{\int_0^\infty B_\lambda d\lambda}, & \text{if } \int_0^\infty B_\lambda d\lambda > 0 \\ 0, & \text{if } \int_0^\infty B_\lambda d\lambda = 0, \end{cases}$$

and where $\Theta(x)$ represents the Heaviside function, and $\xi_1^{(n)}, \xi_1'^{(n)}, \xi_2^{(n)}, \xi_2'^{(n)}, \ldots, \xi_L^{(n)}, \xi_L'^{(n)}$, represent components of a predetermined multi-dimensional strictly deterministic low-discrepancy sequence and where "n" denotes a sequence index, the estimator generator step including the step of generating successive terms for each estimator $\bar{f}^{(n)}_{lds,RR}(x)$ until it generates a term having the value zero;

B. a luminance value generator step of generating a luminance value for the point in the scene as the average of said estimator values generated during the estimator generator step; and C. a pixel value generator step of using the luminance value generated for the point in the scene in generating the pixel value.

23. A computer graphics method as defined in claim 22 in which the kernel K(x,y) further includes a function of at least one type of surface characteristic of a surface in the scene, the estimator generator step including the step of generating the estimator $\bar{f}^{(n)}_{lds,RR}(x)$ in relation to the at least one surface characteristic.

24. A computer graphics method as defined in claim 23 in which the estimator generator step includes the step of generating the estimator $\bar{f}^{(n)}_{lds,RR}(x)$ in relation to at least one photon, the estimator generator step including the step of determining whether the at least one photon's path will be continued in relation to $$\varsigma < \frac{\int_0^\infty I_\lambda f_\lambda c_\lambda d\lambda}{\int_0^\infty I_\lambda f_\lambda d\lambda},$$

where $I_\lambda$ is a weighting value as a function with which the human eye perceives light having the respective wavelength $\lambda$, $f_\lambda$ is the flux of the at least one photon per wavelength $\lambda$, $c_\lambda$ is a function of the respective surface characteristic type as a function of the wavelength $\lambda$, and $\varsigma$ is a selected value.

25. A computer graphics method as defined in claim 24 in which $\varsigma$ is a function of $\xi'^{(n)}_j$.

26. A computer graphics method as defined in claim 24 in which the estimator generator step includes the step of generating the estimator in relation to a plurality of surface characteristic types, each represented by a function, $c_\lambda$ being a sum of the respective functions.

27. A computer graphics method as defined in claim 26 in which the estimator generator step includes the step of generating the estimator $\bar{f}^{(n)}_{ldr,RR}(x)$ in relation to an interaction type, the interaction type being related to the respective surface characteristic types.

28. A computer graphics method as defined in claim 27 in which the estimator generator step includes the step of generating the estimator $\bar{f}^{(n)}_{lds,RR}(x)$ in relation to $$\begin{cases} 0 \le \varsigma < \dfrac{\int_0^\infty I_\lambda f_\lambda d_\lambda d\lambda}{\int_0^\infty I_\lambda f_\lambda d\lambda} & \text{flux } fd \dfrac{\int_0^\infty I_\lambda f_\lambda d\lambda}{\int_0^\infty I_\lambda f_\lambda d_\lambda d\lambda} \\[2ex] \dfrac{\int_0^\infty I_\lambda f_\lambda d_\lambda d\lambda}{\int_0^\infty I_\lambda f_\lambda d\lambda} \le \varsigma < \dfrac{\int_0^\infty I_\lambda f_\lambda (d_\lambda + g_\lambda) d\lambda}{\int_0^\infty I_\lambda f_\lambda d\lambda} & \text{flux } fg \dfrac{\int_0^\infty I_\lambda f_\lambda d\lambda}{\int_0^\infty I_\lambda f_\lambda g_\lambda d\lambda} \\[2ex] \dfrac{\int_0^\infty I_\lambda f_\lambda (d_\lambda + g_\lambda) d\lambda}{\int_0^\infty I_\lambda f_\lambda d\lambda} \le \varsigma < \dfrac{\int_0^\infty I_\lambda f_\lambda (d_\lambda + g_\lambda + s_\lambda) d\lambda}{\int_0^\infty I_\lambda f_\lambda d\lambda} & \text{flux } fs \dfrac{\int_0^\infty I_\lambda f_\lambda d\lambda}{\int_0^\infty I_\lambda f_\lambda s_\lambda d\lambda} \\[2ex] \cdots \end{cases}$$

for respective surface characteristic types associated with respective functions $d_\lambda, g_\lambda, s_\lambda, \ldots$.

29. A computer program product for use in connection with a computer to provide a computer graphics system for generating a pixel value for a pixel in an image, the pixel being representative of a point $\vec{x}$ in a scene, the computer graphics system generating the pixel value to simulate global illumination for a plurality of colors, global illumination being represented by an evaluation of a function $f(x)$, the function $f(x)$ having the form $$f(x) = g(x) + \int_0^1 K(x, y) f(y) dy,$$

where $f(x)$ (and similarly $f(y)$) is an unknown function, and $g(x)$ and $K(x,y)$ are known functions, with $K(x,y)$ serving as a "kernel" of the integral, the kernel $K(x,y)$ including a function associated with at least two colors, the computer program product comprising a computer-readable medium having encoded thereon:

A. an estimator generator module configured to enable the computer to generate a selected number "N" of estimators $\bar{f}^{(n)}_{lds,RR}(x)$ as $$\bar{f}^{(n)}_{lds,RR}(x) = g(x) + K(x, \xi_1^{(n)}) S_1^{(n)} + K(x, \xi_2^{(n)}) S_2^{(n)} + K(x, \xi_3^{(n)}) S_3^{(n)} + \cdots,$$

where $S_i^{(n)}$ are defined recursively as $$S_1^{(n)} : g(\xi_1^{(n)}),$$

$$S_{j+1}^{(n)} := \frac{\Theta\left(M_{K(\xi_{j+1}^n, \xi_j^n), S_j^{(n)}} - \xi_j'^{(n)}\right)}{M_{K(\xi_{j+1}^n, \xi_j^n), S_j^{(n)}}} K(\xi_{j+1}^n, \xi_j^n) S_j^{(n)},$$

with $$M_{A,B} := \begin{cases} \dfrac{\int_0^\infty A_\lambda B_\lambda d\lambda}{\int_0^\infty B_\lambda d\lambda}, & \text{if } \int_0^\infty B_\lambda d\lambda > 0 \\[2ex] 0, & \text{if } \int_0^\infty B_\lambda d\lambda = 0, \end{cases}$$

and where $\Theta(x)$ represents the Heaviside function, and $\xi_1^{(n)}, \xi'^{(n)}_1, \xi_2^{(n)}, \xi'^{(n)}_2, \ldots, \xi_L^{(n)}, \xi'^{(n)}_L$, represent components of a predetermined multi-dimensional strictly deterministic low-discrepancy sequence and where "n" denotes a sequence index, the estimator generator module being configured to enable the computer to generate successive terms for each estimator $\bar{f}^{(n)}_{lds,RR}(x)$ until it generates a term having the value zero;

B. a luminance value module configured to enable the computer to generate a luminance value for the point in the scene as the average of said estimator values generated by said estimator generator module; and C. a pixel value generator module configured to enable the computer to use the luminance value generated for the point in the scene in generating the pixel value.

30. A computer program product as defined in claim 29 in which the kernel K(x,y) further includes a function of at least one type of surface characteristic of a surface in the scene, the estimator generator module being configured to enable the computer to generate the estimator $\bar{f}^{(n)}_{lds,RR}(x)$ in relation to the at least one surface characteristic.

31. A computer program product as defined in claim 30 in which the estimator generator module is configured to enable the computer to generate the estimator $f^{(n)}_{lds,RR}(x)$ in relation to at least one photon, the estimator generator module being configured to enable the computer to determine whether the at least one photon's path will be continued in relation to $$\zeta < \frac{\int_0^\infty I_\lambda f_\lambda c_\lambda d\lambda}{\int_0^\infty I_\lambda f_\lambda d\lambda},$$

where $I_\lambda$ is a weighting value as a function with which the human eye perceives light having the respective wavelength $\lambda$, $f_\lambda$ is the flux of the at least one photon per wavelength $\lambda$, $c_\lambda$ is a function of the respective surface characteristic type as a function of the wavelength $\lambda$, and $\zeta$ is a selected value.

32. A computer program product as defined in claim 31 in which $\zeta$ is a function of $\xi'^{(n)}_j$.

33. A computer program product as defined in claim 31 in which the estimator generator module is configured to enable the computer to generate the estimator in relation to a plurality of surface characteristic types, each represented by a function, $c_\lambda$ being a sum of the respective functions.

34. A computer program product as defined in claim 33 in which the estimator generator module is configured to enable the computer to generate the estimator $f^{(n)}_{ldr,RR}(x)$ in relation to an interaction type, the interaction type being related to the respective surface characteristic types.

35. A computer program product as defined in claim 34 in which the estimator generator module is configured to enable the computer to generate the estimator $f^{(n)}_{lds,RR}(x)$ in relation to $$\begin{cases} 0 \le \zeta < \dfrac{\int_0^\infty I_\lambda f_\lambda d_\lambda d\lambda}{\int_0^\infty I_\lambda f_\lambda d\lambda} & \text{flux } fd \dfrac{\int_0^\infty I_\lambda f_\lambda d\lambda}{\int_0^\infty I_\lambda f_\lambda d_\lambda d\lambda} \\[1em] \dfrac{\int_0^\infty I_\lambda f_\lambda d_\lambda d\lambda}{\int_0^\infty I_\lambda f_\lambda d\lambda} \le \zeta < \dfrac{\int_0^\infty I_\lambda f_\lambda (d_\lambda + g_\lambda) d\lambda}{\int_0^\infty I_\lambda f_\lambda d\lambda} & \text{flux } fg \dfrac{\int_0^\infty I_\lambda f_\lambda d\lambda}{\int_0^\infty I_\lambda f_\lambda g_\lambda d\lambda} \\[1em] \dfrac{\int_0^\infty I_\lambda f_\lambda (d_\lambda + g_\lambda) d\lambda}{\int_0^\infty I_\lambda f_\lambda d\lambda} \le \zeta < & \text{flux } fs \dfrac{\int_0^\infty I_\lambda f_\lambda d\lambda}{\int_0^\infty I_\lambda f_\lambda s_\lambda d\lambda} \\[1em] \dfrac{\int_0^\infty I_\lambda f_\lambda (d_\lambda + g_\lambda + s_\lambda) d\lambda}{\int_0^\infty I_\lambda f_\lambda d\lambda} \\ \cdots, \end{cases}$$

for respective surface characteristic types associated with respective functions $d_\lambda$, $g_\lambda$, $s_\lambda$, . . . .

36. A computer program product for use in connection with a computer to provide a computer graphic systems for generating a pixel value for a pixel in an image, the pixel being representative of a point $\vec{x}$ in a scene, the computer graphics system generating the pixel value to simulate global illumination for a plurality of colors, global illumination being represented by an evaluation of a function $f(x)$, the function $f(x)$ having the form $$f(x) = g(x) + \int_0^1 K(x, y) f(y) dy,$$

where $f(x)$ (and similarly $f(y)$) is an unknown function, and $g(x)$ and $K(x,y)$ are known functions, with $K(x,y)$ serving as a "kernel" of the integral, the kernel $K(x,y)$ including a function associated with at least two colors, the computer program product comprising a computer-readable medium having encoded thereon:

A. an estimator generator module configured to enable the computer to generate a selected number "N" of estimators $f^{(n)}_{lds,RR}(x)$ as $$f^{(n)}_{lds,RR}(x) = g(x) + T^{(n)}_1(x) g(\xi^{(n)}_1) + T^{(n)}_2(x) g(\xi^{(n)}_2) + T^{(n)}_3(x) g(\xi^{(n)}_3) + \cdots,$$

where $S^{(n)}_i$ are defined recursively as $$T^{(n)}_1(x) := \frac{\Theta\left(M_{K(x,\xi^{(n)}_1),1} - \xi'^{(n)}_1\right)}{M_{K(x,\xi^{(n)}_1),1}} K(x, \xi^{(n)}_1),$$

$$T^{(n)}_{j+1}(x) := \frac{\Theta\left(M_{K(\xi^{(n)}_j, \xi^{(n)}_{j+1}), T^{(n)}_j(x)} - \xi'^{(n)}_{j+1}\right)}{M_{K(\xi^{(n)}_j, \xi^{(n)}_{j+1}), T^{(n)}_j(x)}} K(\xi^{(n)}_j, \xi^{(n)}_{j+1})$$

with $$M_{A,B} := \begin{cases} \dfrac{\int_0^\infty A_\lambda B_\lambda d\lambda}{\int_0^\infty B_\lambda d\lambda}, & \text{if } \int_0^\infty B_\lambda d\lambda > 0 \\[1em] 0, & \text{if } \int_0^\infty B_\lambda d\lambda = 0, \end{cases}$$

and where $\Theta(x)$ represents the Heaviside function, and $\xi^{(n)}_1, \xi'^{(n)}_1, \xi^{(n)}_2, \xi'^{(n)}_2, \ldots, \xi^{(n)}_L, \xi'^{(n)}_L$, represent components of a predetermined multi-dimensional strictly deterministic low-discrepancy sequence and where "n" denotes a sequence index, the estimator generator module being configured to enable the computer to generate successive terms for each estimator $f^{(n)}_{lds,RR}(x)$ until it generates a term having the value zero;

B. a luminance value generator configured to enable the computer to generate a luminance value for the point in the scene as the average of said estimator values generated by said estimator generator module; and C. a pixel value generator module configured to enable the computer to use the luminance value generated for the point in the scene in generating the pixel value.

37. A computer program product as defined in claim 36 in which the kernel $K(x,y)$ further includes a function of at least one type of surface characteristic of a surface in the scene, the estimator generator module being configured to enable the computer to generate the estimator $f^{(n)}_{lds,RR}(x)$ in relation to the at least one surface characteristic.

38. A computer program product as defined in claim 37 in which the estimator generator module is configured to enable the computer to generate the estimator $f^{(n)}_{lds,RR}(x)$ in relation to at least one photon, the estimator generator module being configured to determine whether the at least one photon's path will be continued in relation to $$\zeta < \frac{\int_0^\infty I_\lambda f_\lambda c_\lambda d\lambda}{\int_0^\infty I_\lambda f_\lambda d\lambda},$$

where $I_\lambda$ is a weighting value as a function with which the human eye perceives light having the respective wavelength $\lambda$, $f_\lambda$ is the flux of the at least one photon per wavelength $\lambda$, $c_\lambda$ is a function of the respective surface characteristic type as a function of the wavelength $\lambda$, and $\zeta$ is a selected value.

39. A computer program product as defined in claim 38 in which $\zeta$ is a function of $\xi'^{(n)}_j$.

40. A computer program product as defined in claim 38 in which the estimator generator module is configured to enable the computer to generate the estimator in relation to a plurality of surface characteristic types, each represented by a function, $c_\lambda$ being a sum of the respective functions.

41. A computer program product as defined in claim 40 in which the estimator generator module is configured to enable the computer to generate the estimator $f^{(n)}_{ldr\_RR}(x)$ in relation to an interaction type, the interaction type being related to the respective surface characteristic types.

42. A computer program product as defined in claim 41 in which the estimator generator module is configured to enable the computer to generate the estimator $f^{(n)}_{lds\_RR}(x)$ in relation to $$\begin{cases} 0 \leq \varsigma < \dfrac{\int_0^\infty I_\lambda f_\lambda d_\lambda d\lambda}{\int_0^\infty I_\lambda f_\lambda d\lambda} & \text{flux } fd \dfrac{\int_0^\infty I_\lambda f_\lambda d\lambda}{\int_0^\infty I_\lambda f_\lambda d_\lambda d\lambda} \\[2ex] \dfrac{\int_0^\infty I_\lambda f_\lambda d_\lambda d\lambda}{\int_0^\infty I_\lambda f_\lambda d\lambda} \leq \varsigma < \dfrac{\int_0^\infty I_\lambda f_\lambda (d_\lambda + g_\lambda) d\lambda}{\int_0^\infty I_\lambda f_\lambda d\lambda} & \text{flux } fg \dfrac{\int_0^\infty I_\lambda f_\lambda d\lambda}{\int_0^\infty I_\lambda f_\lambda g_\lambda d\lambda} \\[2ex] \dfrac{\int_0^\infty I_\lambda f_\lambda (d_\lambda + g_\lambda) d\lambda}{\int_0^\infty I_\lambda f_\lambda d\lambda} \leq \varsigma < & \text{flux } fs \dfrac{\int_0^\infty I_\lambda f_\lambda d\lambda}{\int_0^\infty I_\lambda f_\lambda s_\lambda d\lambda} \\[2ex] \dfrac{\int_0^\infty I_\lambda f_\lambda (d_\lambda + g_\lambda + s_\lambda) d\lambda}{\int_0^\infty I_\lambda f_\lambda d\lambda} \\ \cdots, \end{cases}$$

for respective surface characteristic types associated with respective functions $d_\lambda$, $g_\lambda$, $s_\lambda$, . . . .

* * * * *